(12) United States Patent
Starns

(10) Patent No.: US 11,663,561 B2
(45) Date of Patent: May 30, 2023

(54) CHARGE SCHEDULING ACROSS A FLEET OF AUTONOMOUS VEHICLES (AVS)

(71) Applicant: Lyft, Inc., San Francisco, CA (US)

(72) Inventor: Alexander Thomas Starns, Menlo Park, CA (US)

(73) Assignee: Lyft, Inc., San Francisco, CA (US)

( * ) Notice: Subject to any disclaimer, the term of this patent is extended or adjusted under 35 U.S.C. 154(b) by 0 days.

(21) Appl. No.: 15/858,300

(22) Filed: Dec. 29, 2017

(65) Prior Publication Data

US 2019/0205842 A1 Jul. 4, 2019

(51) Int. Cl.
| | | |
|---|---|---|
| *G06Q 10/00* | (2023.01) | |
| *G06Q 10/20* | (2023.01) | |
| *G06Q 30/0601* | (2023.01) | |
| *G05D 1/00* | (2006.01) | |
| *G05D 1/02* | (2020.01) | |

(52) U.S. Cl.
CPC ........... *G06Q 10/20* (2013.01); *G05D 1/0088* (2013.01); *G05D 1/0291* (2013.01); *G06Q 30/0639* (2013.01)

(58) Field of Classification Search
CPC .. G06Q 10/20; G06Q 30/0639; G05D 1/0088; G05D 1/0291
See application file for complete search history.

(56) References Cited

U.S. PATENT DOCUMENTS

| | | | | | |
|---|---|---|---|---|---|
| 5,833,294 | A * | 11/1998 | Williams | ................... | B60S 5/00 296/24.32 |
| 9,139,199 | B2 * | 9/2015 | Harvey | ................... | E04H 6/422 |
| 9,148,027 | B2 * | 9/2015 | Shane | ....................... | H02J 3/14 |
| 10,423,934 | B1 * | 9/2019 | Zanghi | ............. | G06Q 10/06398 |
| 2015/0337587 | A1 * | 11/2015 | Lu | ........................... | E05F 15/70 701/49 |
| 2015/0348335 | A1 * | 12/2015 | Ramanujam | ........... | G06Q 10/00 701/23 |
| 2015/0367740 | A1 * | 12/2015 | McGrath | ............... | B60L 11/184 320/137 |
| 2018/0012156 | A1 * | 1/2018 | Voelz | ..................... | B60L 58/10 |

(Continued)

FOREIGN PATENT DOCUMENTS

| | | | | | |
|---|---|---|---|---|---|
| WO | WO-2012072717 | A1 * | 6/2012 | ............ | G07F 11/002 |
| WO | WO-2019125395 | A1 * | 6/2019 | ............ | B60L 53/126 |

*Primary Examiner* — David P. Merlino

(74) *Attorney, Agent, or Firm* — Baker Botts L.L.P.

(57) ABSTRACT

In one embodiment, a system includes one or more processors and one or more computer-readable non-transitory storage media coupled to one or more of the processors. The one or more computer-readable non-transitory storage media include instructions operable when executed by one or more of the processors to cause the system to perform operations including receiving service-facility data associated with a service facility that includes one or more service regions for servicing autonomous vehicles. Each of the one or more service regions is configured to charge an autonomous vehicle. The service facility data includes location information indicating a location of each of the one or more service regions; and availability information indicating an availability of each of the one or more service regions. The operations also include receiving vehicle data associated with a number of autonomous vehicles. The vehicle data includes a charge level of a respective autonomous vehicle.

20 Claims, 8 Drawing Sheets

(56) References Cited

U.S. PATENT DOCUMENTS

| | | | |
|---|---|---|---|
| 2018/0012198 A1* | 1/2018 | Ricci | G08G 1/096827 |
| 2018/0081360 A1* | 3/2018 | Bostick | G05D 1/0088 |
| 2018/0189683 A1* | 7/2018 | Newman | G06Q 10/02 |
| 2018/0201148 A1* | 7/2018 | Donnelly | B60W 20/13 |
| 2018/0259945 A1* | 9/2018 | Sillay | G06Q 10/20 |
| 2019/0011931 A1* | 1/2019 | Selvam | G08G 1/202 |
| 2019/0095872 A1* | 3/2019 | Lalwani | G06Q 30/0633 |
| 2019/0108700 A1* | 4/2019 | Chelnik | G07C 9/28 |
| 2019/0114692 A1* | 4/2019 | Briggs | G06Q 10/0875 |
| 2020/0074411 A1* | 3/2020 | Hughes | G06Q 10/06 |

* cited by examiner

CHARGE SCHEDULING ACROSS A FLEET OF AUTONOMOUS VEHICLES (AVS)

BACKGROUND

A transportation management system may fulfill ride requests by dispatching an autonomous vehicle (AV). As an example, in response to a ride request, the transportation management system may dispatch and instruct an AV managed by the system to transport the requestor to their destination. An AV is a vehicle that is capable of sensing its environment and navigating with little to no human input. The AV may be equipped with a variety of systems or modules for enabling it to determine its surroundings and safely fulfill ride requests by autonomously navigating to pick up requestors and transporting them to their target destinations.

At regular intervals, AVs are taken offline for routine servicing, such as for example, recharging/refueling, cleaning, repairing the AV, or downloading telemetry or performance data from a computing system of the AV. This periodic downtime for maintenance or repairs may make meeting demand for ride services and matching available vehicles to riders more complex, especially when demand is high. Compensating for this downtime may lead to purchasing more AVs than would otherwise be needed or bypassing regular maintenance to ensure the volume of ride requests are met at any given time at a given service level. Reducing the amount of downtime may help free up resources and maximize efficiency of the AV resources managed by a fleet. Given the importance of having properly maintained AVs and the likely high frequency of maintenance needed by such vehicles (e.g., since AVs will be constantly operating), the time, resources, and opportunity cost of AV maintenance may be significantly high, especially when multiplied by the number of AVs in a fleet.

DESCRIPTION OF EXAMPLE EMBODIMENTS

Figure 1:
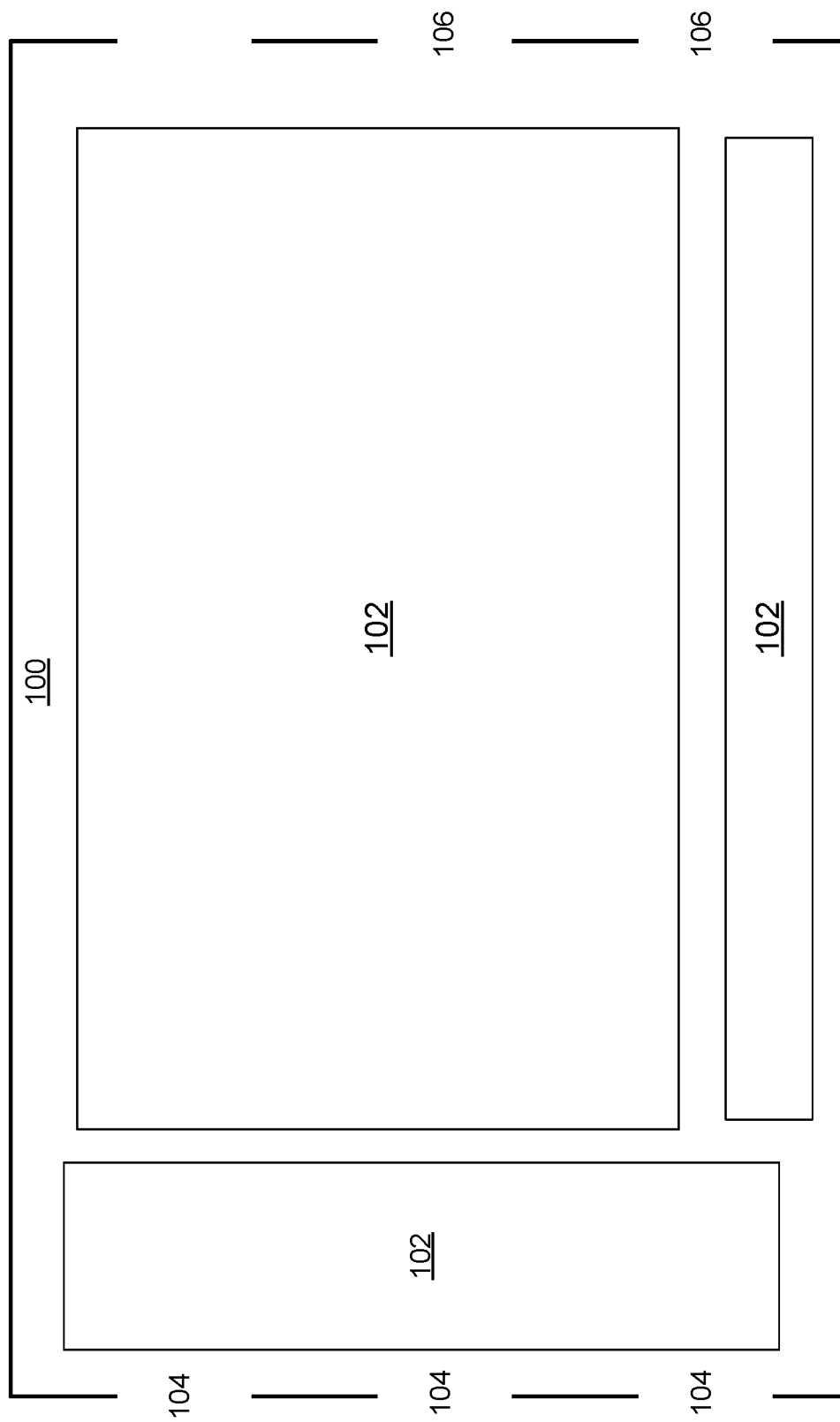
FIG. 1 illustrates an example plan view of a service facility at a fixed location.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Operating a successful transportation service using autonomous vehicles (AVs) involves more than matching and dispatching the AVs to fulfill ride requests from ride requestors. As an example and not by way of limitation, AVs need to be kept in good working order. The requirement that the AVs are periodically taken offline in order to service them, such as for example recharging/refueling, cleaning, or repairing the AV, updating maps and software of a computing system of the AV, or downloading telemetry and performance data, makes meeting demand for ride services and matching available AVs to ride requestors more complex, especially when demand is high.

In many cases, the ride-sharing industry is adopting the use of AVs that are electric vehicles (EVs). These EVs are powered by rechargeable batteries that need to be periodically recharged. In this case, the rechargeable batteries of these autonomous EVs need to be taken offline and recalled to a nearest charging station. While the rechargeable batteries are being recharged at a charging station, the AV will not be able to transport ride requestors for a period of time (e.g., 3 hours). Particular embodiments described herein relate to a service facility for servicing autonomous EVs that is located at a fixed location. In particular embodiments, the service facility may include a number of service bays or regions to consolidate the maintenance operations for the AVs in a single facility. As an example and not by way of limitation, these service regions may include a charging/fueling region, cleaning region, or tire changing/rotation region. In addition, one or more service region (e.g., the charging region) may also be configured to concurrently perform other maintenance or services on the AVs (e.g., update software). In particular embodiments, a service facility management system, described in further detail below, may determine one or more sequences of service tasks to be performed on the AVs, coordinate the flow of the AVs within the service facility, and/or assign the AVs to a particular region of the service facility for particular servicing, as an AV is not configured to handle such tasks, especially across a fleet of vehicles and/or to consider the requirements of the AV within the context of the larger fleet of AVs.

AVs may periodically be recalled to a service facility with a fixed location for routine maintenance (e.g., charging of rechargeable batteries and software upgrades). Having a service facility that concurrently performs multiple types of maintenance tasks on an AV improves the efficient use of the AV's offline time. By minimizing an AV's offline time, the AV's online time for servicing ride requestors may be maximized. Given the importance of having a properly maintained fleet of AVs, the time, resources, and opportunity cost of AV maintenance may be significantly high, especially when multiplied by the number of AVs in a fleet.

Particular embodiments described herein further relate to a mobile platform for charging autonomous EVs in the field. When an AV is running low on charge, instead of immediately shutting down or recalling the AV, it may be preferable to direct the AV to navigate to a central location in the field to be recharged and have the AV continue operating since the AV may be brought back online more quickly without spending the time to go back and forth from the service facility. In particular embodiments, the AV may park itself at a nearby location in response to determining that its rechargeable battery requires recharging. In other embodiments, the AV may park itself at the nearby location to have other services performed on the AV, such as for example routine cleaning, detailing, changing a tire, or vacuuming. The parking location may be predetermined based on the space and/or service requirements for mobile servicing or the AV may be able to evaluate nearby parking areas and select an area that has sufficient space and a configuration that will ensure safe and secure charging. One or more service vehicles with portable electric charging stations may be sent to the mobile charging location to facilitate recharging the AV in the field. Other AVs may be informed of the parking location and may meet the portable electric charging station for charging. Once the battery recharging is performed for the AV, the AV may resume normal operations. Embodiments illustrated and described herein may result in higher utilization of AVs with reduced downtime since AVs may not need to be recalled when the rechargeable batteries are low on charge during operation and thus, AVs may remain in the field providing transportation instead of traveling to a central service location.

FIG. 1 illustrates an example plan view of a service facility at a fixed location. In particular embodiments, service facility 100 may further include a number of service regions or bays 102. As an example and not by way of limitation, these service regions 102 may include a charging/fueling station, cleaning station, or tire changing/rotation station. Embodiments below describe a service facility that concurrently performs multiple types of maintenance tasks on an AV improves the efficient use of the AV's offline time. In particular, maintaining a fleet of different makes, models, and types of AVs that have differing requirements and levels of necessity may concurrently require service, and may be assigned to different service regions of service facility 100 to minimize downtime and optimize available AV resources.

As illustrated in the example of FIG. 1, service facility 100 may be configured for AVs to enter through one of a number of entryways 104. In particular embodiments, an AV may stop for maintenance in a region 102 near entryways 104. As an example and not by way of limitation, AV may stop in automated carwash in a particular region 102 proximate to entryway 106 of service facility 100 prior to navigating to another region 102 having a number of charging stations. Once the AV has navigated to a particular charging station that it has been assigned, as described in more detail below, the AV may be connected to its assigned charging station for charging. As described in more detail below, a computer system associated with service facility 100 may assign the AV to a particular charging station based on the amount of time required to sufficiently charge the AV and to allow access to an exit way 106 to resume operation. Precise scheduling and management of assigning vehicles to the various regions requiring the same services at the same time is important to ensure efficient use of the services of service facility 100 and maintain unrestricted movement of the AVs into and out of service facility 100. When the charging of the AV has been completed (e.g., as determined by a full battery or a pre-determined percentage of charge), the AV may exit service facility 100 through a nearest exit way 106 to resume normal operation.

In particular embodiments, a region 102 of service facility 100 may be configured to perform software maintenance on the computing system of the AVs. As an example and not by way of limitation, region 102 configured for software maintenance may include one or more data centers. The data centers may include one or more wired connections (e.g., Ethernet) that are configured to interface with a data port of the AVs. The data centers may interface with the computing system of the AVs through a wireless connection (e.g., WI-FI or BLUETOOTH). Software maintenance may include routine software maintenance such as for example, downloading telemetry or performance data from the AV computing system or installing software patches. As another example, software maintenance may include software updates or repairs to the operating system of the computing system of the AVs. In particular embodiments, data from the computing system of the AVs may be transferred from the local data center to a computing system of an AV computing environment, described below, through a fiber-optic line or wirelessly using a microwave array (or other wireless telecommunication technology (e.g. satellite communication or RF spectrum transmitters) on the roof of service facility 100. Although this disclosure describes a service facility having a particular layout with particular service regions, this disclosure contemplates a service facility having any suitable layout that includes any suitable service regions.

Figure 2A:
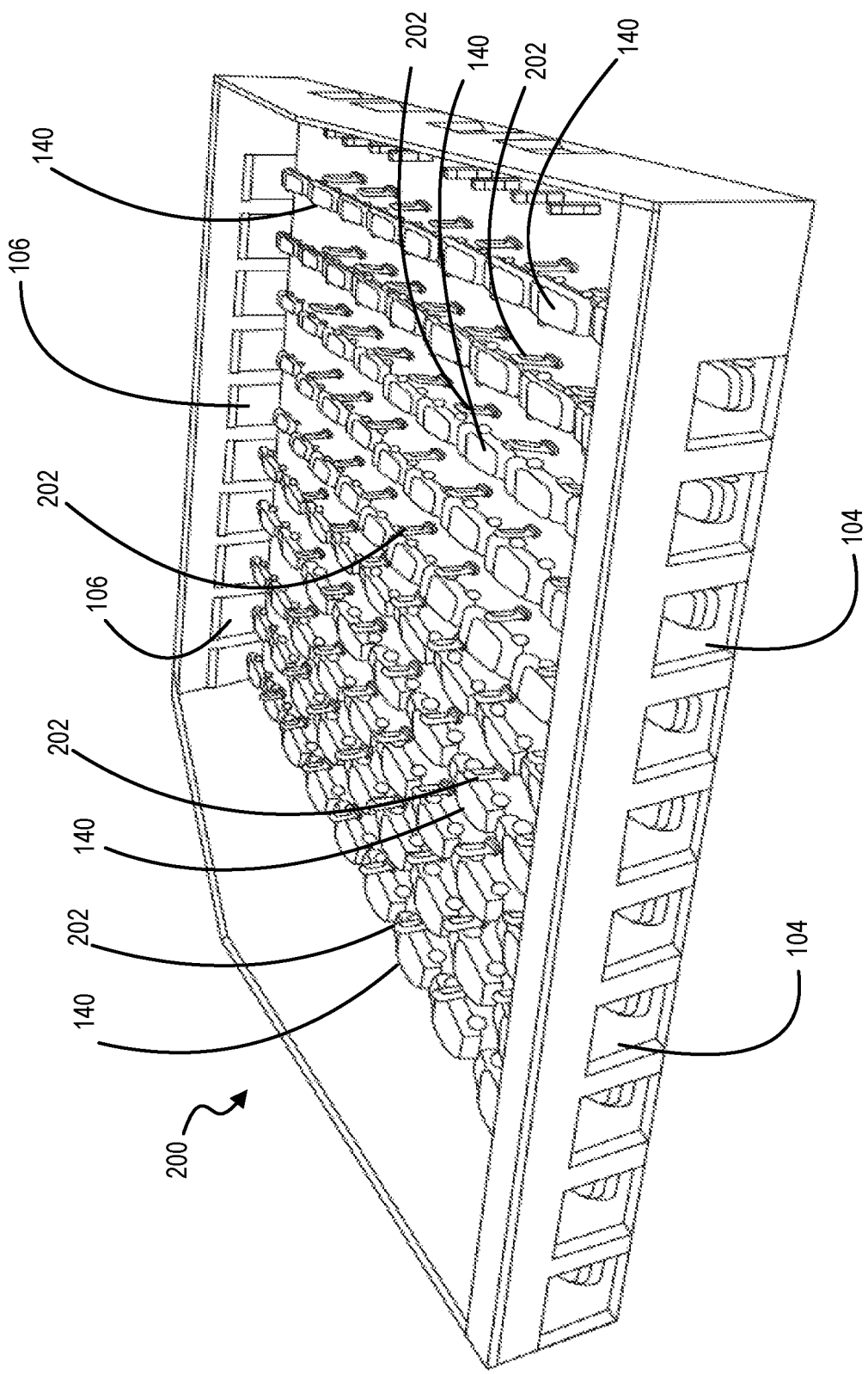
FIG. 2A illustrates a service facility at a fixed location.

FIG. 2A illustrates a service facility at a fixed location. As described above, one of the regions within service facility 200 may be configured with a number of charging stations 202 for charging the batteries of AVs 140. In particular embodiments, AV 140 may be assigned to a particular charging station 202 by a computer system associated with service facility 200. AVs 140 may be assigned to their particular charging stations based on an anticipated charge time (or fuel level), so that AVs 140 requiring the least anticipated amount of charge time may be assigned to a charging station 202 closer to exit way 106. This assignment may alleviate wait times due to congestion from AVs 140 being charged. As an example and not by way of limitation, AVs 140 may be assigned to charging stations near alternating exit ways 106 to alleviate congestion while exiting service facility 100. AVs 140 may be assigned to a respective charging station 202 in a pattern or arrangement meant to maximize throughput in service facility 200 or to concurrently complete charging of AVs 140 as a group or to be ready at a specific time (e.g., to meet a predicted surge in ride requests). In particular embodiments, the time that charging of AV 140 is started may be delayed or reduced to facilitate the flow of AVs 140 leaving the region with charging stations 202. As an example and not by way of limitation, the computing system of service facility 100 may direct and/or guide how and/or when AVs 140 are positioned within and/or to the service regions of service facility 100.

Factors determining the movement and positioning of AVs 140 within service facility 100 may include the configuration of service facility 100, availability of charging stations 202, any required servicing (e.g., routine maintenance, software/data maintenance, cleaning, part replacement, repairs, etc.), idle times of AVs 140 in service facility 100, or the position of AVs 140 being charged and/or serviced. In addition, AVs 140 may be positioned or moved based on service needs, to facilitate simultaneous departure for a set (or row) of AVs 140, to complete service at a particular time, or based on a car's capabilities (e.g. battery size or performance capabilities if multiple AV types are being serviced). These factors may influence the flow of AVs 140 within service facility 200 to arrange AVs 140 with the shortest service (e.g., charging) time closest to an exit way 106. In addition, the factors described above, may influence the positioning of AVs 140 so that there is a relatively even distribution of AVs 140 leaving exit ways 106 once their servicing is completed.

As an example and not by way of limitation, 50 AVs may arrive at service facility 200 and a management computing system of service facility 200 may analyze the charge level of the respective AVs 140 and determine the amount of time to charge each AV 140. It should be noted that the charging time may vary because, for example, 15 cars may have larger batteries than others that will take longer to charge. The management computing system may analyze the currently available charging stations 202 to optimize assignment of AVs 140 into the available charging stations 202 to ensure charging of AVs 140 is completed in approximately the same amount of time or so that AVs that take longer to charge are not blocking the AVs that are done. In particular embodiments, the movements and assigned locations of AVs 140 may be continually updated based at least on the current status of the regions within service facility 200 and the anticipated demand of services. Although this disclosure describes movement or positioning of AVs being based on particular factors, this disclosure contemplates movement or positioning of AVs being based any suitable factors, such as for example, to optimize the AV fleet performance relative to metrics governing utilization, efficiency or profitability for the fleet as a whole.

In particular embodiments, service facility 100 may include one or more gangways (not shown). The gangways located in service facility 100 may include stairs to the space separating rows of charging stations 202 in region 102 to allow workers to access, monitor, or service any of the charging AVs 140. In addition, the gangway allows workers to move throughout service facility 100 without impeding the flow of AVs 140. In particular embodiments, the workers may monitor the occupancy of charging stations 202 and intervene if necessary if there are any issues during charging of AVs 140. Similarly, the gangway may allow workers to access a particular region 102 configured to perform maintenance or repairs on AVs 140 without disrupting traffic flow within service facility 100 and to comply with regulations or best-practices regarding workplace safety.

In particular embodiments, charging stations 202 may include a data connection to AV 140, so that while the rechargeable batteries of AVs 140 are being charged in the service facility, AVs 140 may concurrently perform software maintenance (e.g., uploading software updates/patches or download telemetry and any type of gathered data). As an example and not by way of limitation, the computing system of service facility 100 may obtain sensor data from AV while the autonomous vehicle is being charged, where the sensor data is gathered by sensors of AV 140 while AV 140 is operating in the field. The amount of telemetry or performance data stored in the computing system AV 140 and the amount of time needed to download this data may be large. By combining software maintenance and charging operations, the amount of time servicing AV 140 may be more efficiently utilized and the overall downtime reduced.

In particular embodiments, the region of service facility 100 that is configured with charging stations 202 may further include a number of car stackers. As an example and not by way of limitation, each car stacker may be configured to hold a pre-determined number (e.g., four) of AVs 140 in a "stacked" configuration. In particular embodiments, each position of the car stacker may include an integrated charger and data connection, described above, that are configured to concurrently charge and update software or download data of a computing system of AV 140. AVs 140 in the topmost position of the car stacker may have to wait for the lower levels of the car stacker to be unoccupied in order to be lowered to the ground level and resume operation. Factors determining the movement and positioning of AVs 140 within the car stackers may include optimizing for simultaneous departure, to depart the car stacker at a certain time, or based on AV specification (e.g., AVs 140 with larger batteries may be placed on top since they take longer to charge). In particular embodiments, AVs 140 with the longest anticipated charging time (lowest amount of remaining charge) may be assigned the higher positions in the car stacker. In other embodiments, AVs 140 with similar anticipated charging times may be assigned to the same car stacker, so that the wait time for any AV 140 to be unloaded from the car stacker is minimized.

Figure 2B:
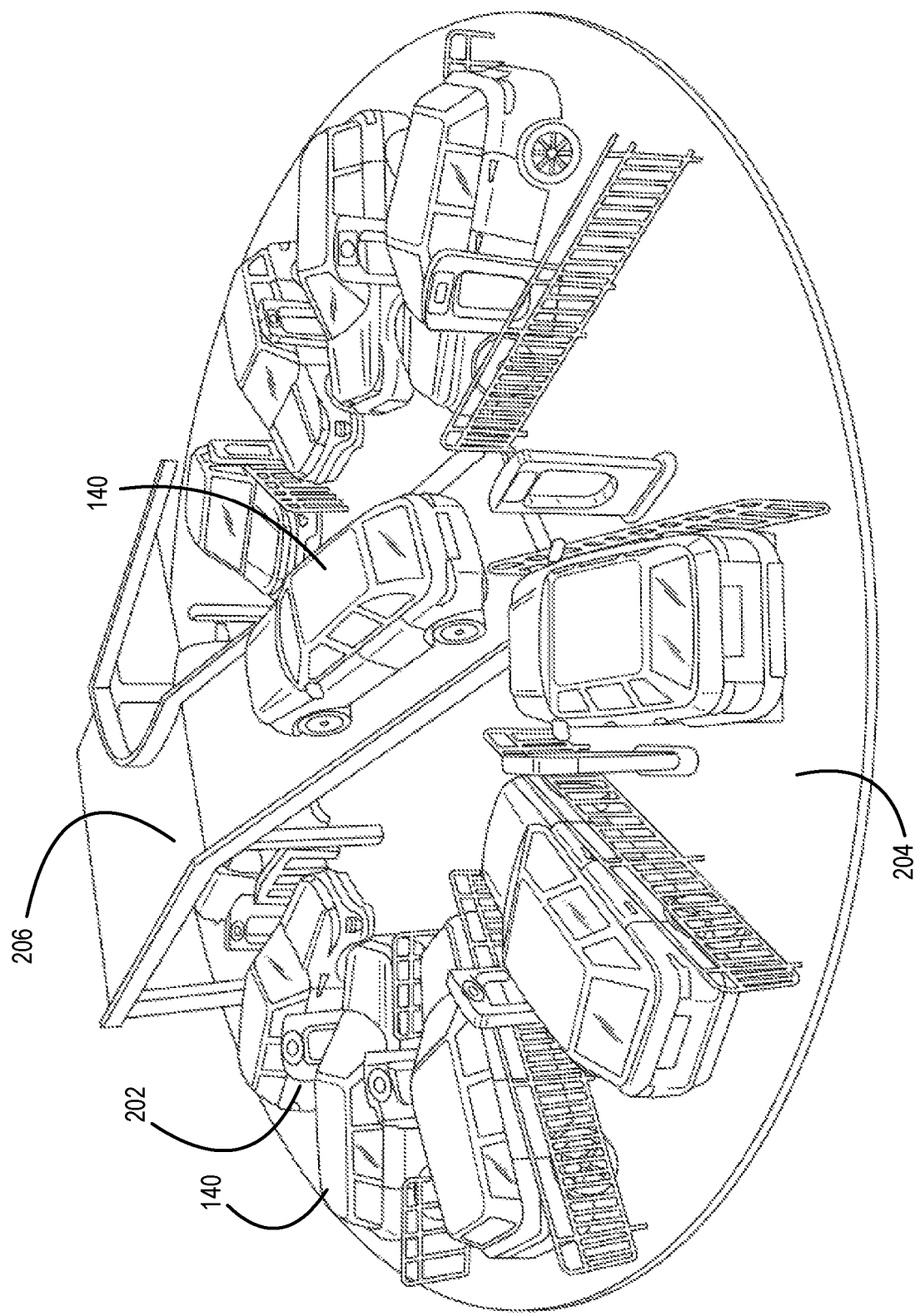
FIG. 2B illustrates a service facility at a fixed location with a rotating carousel.

FIG. 2B illustrates a service facility at a fixed location with a rotating carousel. In particular embodiments, the region of the service facility configured with charging stations 202 may also include a rotating carousel 204. A service facility management system, described in more detail below, of the service facility may track the location of AVs 140 and manage the assignment of AVs 140 to particular regions within the service facility. Rotating carousel 204 may allow for efficient exiting of AVs 140 from the charging station 202 region. As an example and not by way of limitation, rotating carousel 204 may include a number of charging stations 202 that may be arranged in a circular pattern near one of the entryways 104. In addition, a ramp may be positioned in the facility of rotating carousel 202. As AVs 140 enter through entryway 104, they may park next to a nearest charging station 202 to begin charging. The rotation of rotating carousel 204 may be timed to coincide with the time needed to completely charge the battery of AVs 140. After a complete rotation on rotating carousel 204, AV 140 parked in front of the ramp may disconnect from its charging station 202 and use ramp 206 to exit service facility 100 through an exit way 106. AVs 140 may also exit rotating carousel 204 using the same path used to enter rotating carousel 204 or another ground-level entrance.

Figure 3:
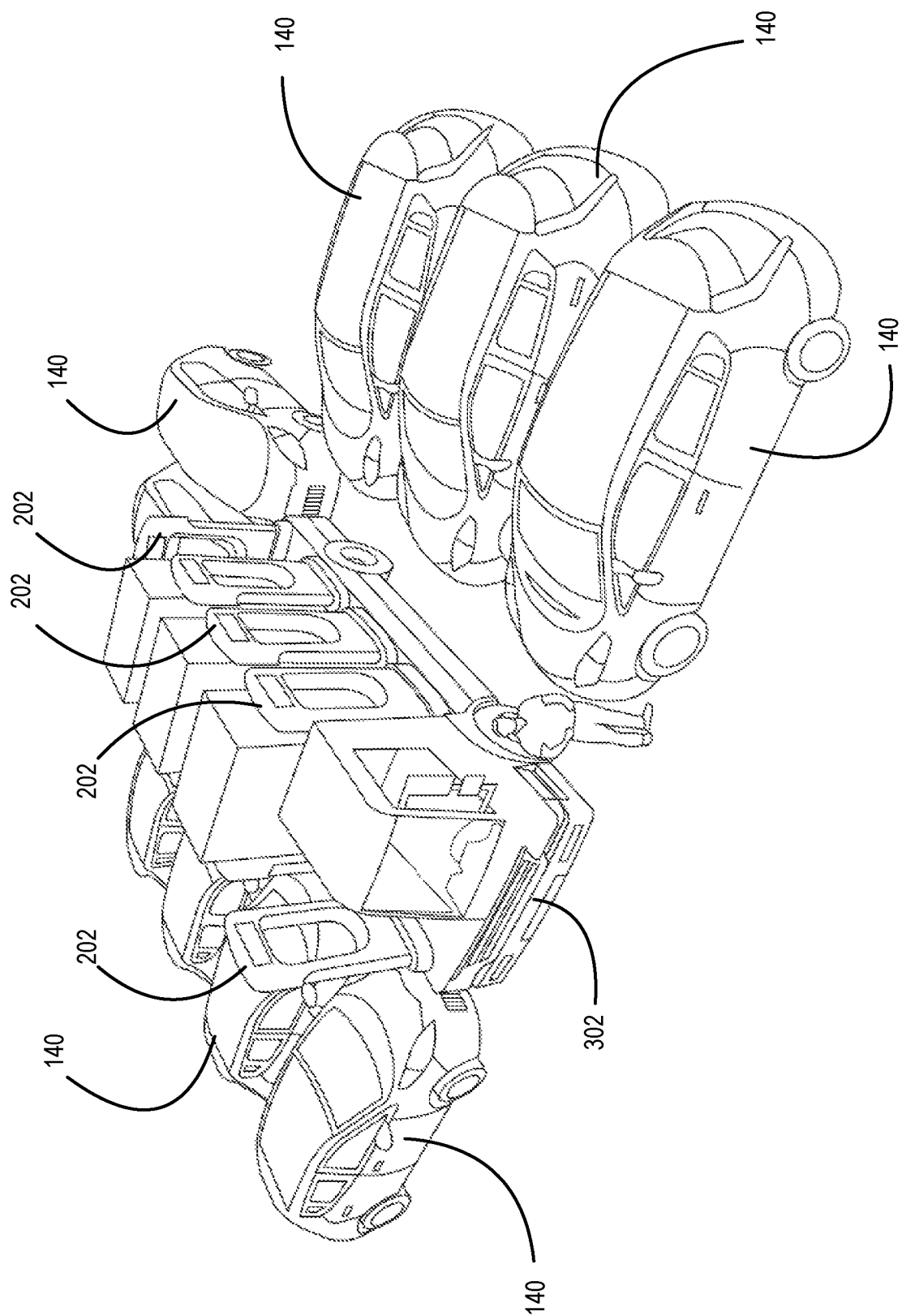
FIG. 3 illustrates an example of a charging service vehicle.

FIG. 3 illustrates an example of a charging service vehicle. When an AV 140 is running low on charge, instead of immediately shutting down or recalling the AV, it may be preferable to direct the AV to navigate to a mobile charging location or a parking location in the field to be recharged and have the AV continue operating since the AV may be brought back online more quickly without spending the time to go back and forth from a service facility (e.g., service facility 100). In particular embodiments, charging service vehicle 302 may include multiple charging stations 202 that may charge the rechargeable batteries of AVs 140. As an example and not by way of limitation, charging service vehicle 302 may include one or more batteries, electric generator, hydrogen fuel cell, or any combination thereof. In particular embodiments, charging service vehicle 302 may be an autonomous vehicle that is configured navigate itself to different charging locations.

In particular embodiments, AV 140 may park itself at relatively nearby location in response to determining that its rechargeable battery requires charging. A transportation management system, described below, may direct and/or navigate charging service vehicle 302 and AVs 140 to the mobile charging location (e.g., an empty parking lot with sufficient space for the charging service vehicle and several AVs). In other embodiments, charging service vehicle 302 may be directed and/or navigated to a location of AVs 140. In particular embodiments, the transportation management system may assign a particular AV 140 to particular charging station 202. As an example and not by way of limitation, AVs 140 may self-detect an available charging station 202 or may be assigned to charging station 202 that AV 140 may identify using a radio-frequency identification (RFID) signal sent by charging station 202. As another example, AVs 140 may be unlocked when they are sufficiently close to charging station 202 allowing a human operator of charging service vehicle 302 to manually drive AV 140 to an available charging station 202. AVs 140 may then be connected to the charging station 202. Once the battery recharging is performed, AV 140 may resume normal operations.

In particular embodiments, charging of AVs may be performed in dedicated locations. As an example and not by way of limitation, an area of a facility (e.g., a parking lot or structure) may be configured with a dedicated area for automated charging. The charging area may be partitioned from the rest of the facility and access to the dedicated area controlled by an automated gate system. For example, AVs 140 may be equipped with a RFID transponder that provides an authentication signal to a receiver of the gating system. A computing system of the gating system may authenticate AV 140 and raise the gate to allow AV 140 access to the charging area. As another example, AV 140 may enter the dedicated area and identify different charging stations by following visual indictors (e.g., LED lights or painted symbols) displayed on the road or walls. In particular embodiments, the charging area may include a number of spaces configured to wirelessly charge the battery of AV 140 (e.g., charging pad underneath AV 140). As an example and not by way of limitation, AV 140 may navigate to the spaces for charging using a RFID signal sent by a charging station. Once charging is completed, AV 140 may leave the charging area and resume normal operations. In particular embodiments, instead of a large dedicated charging facility, AVs 140 may be serviced using a number of smaller, permanent charging stations distributed throughout a region.

Figure 4:
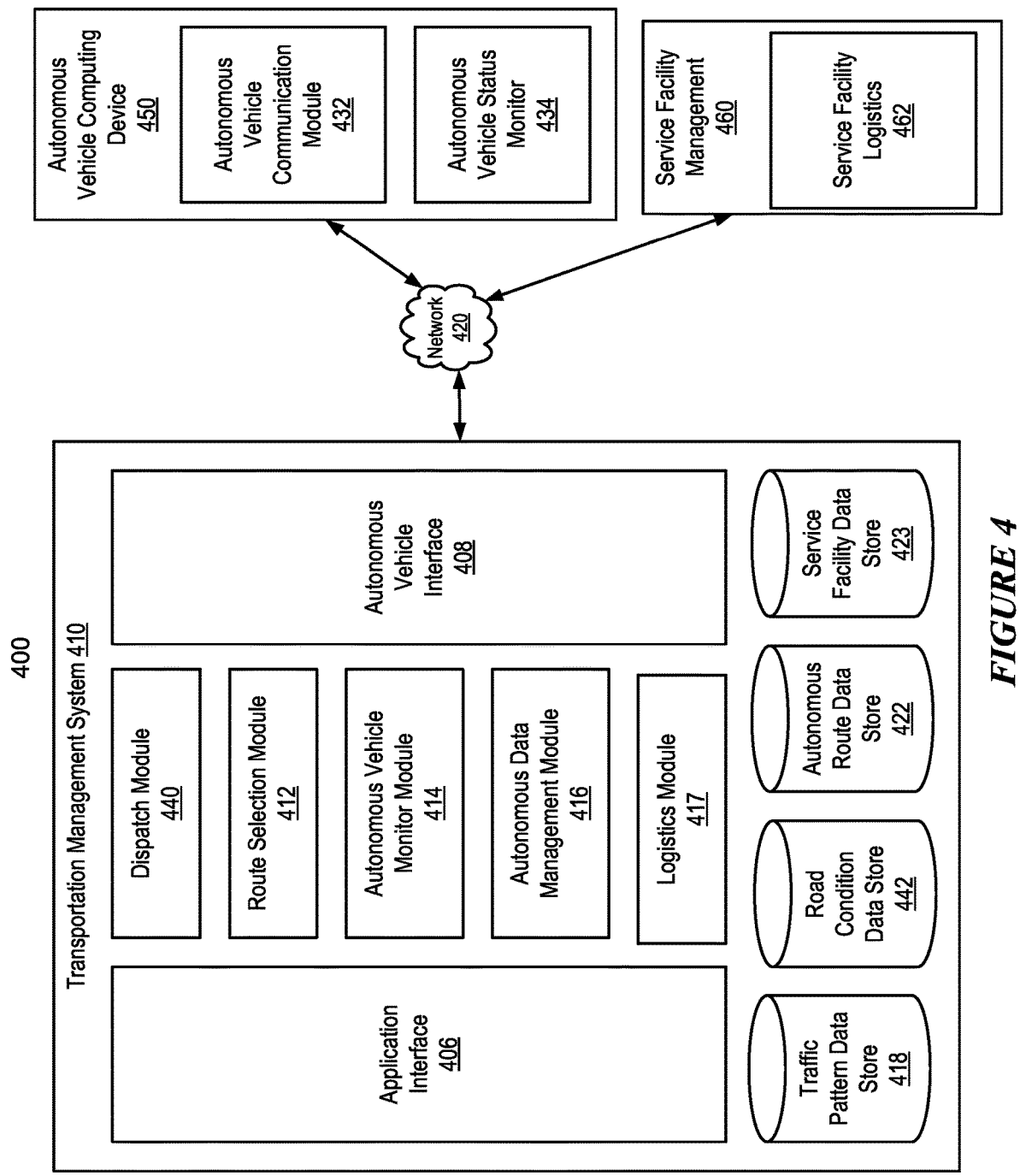
FIG. 4 illustrates an example AV computing environment.

FIG. 4 illustrates an example AV computing environment. In particular embodiments, AV computing environment 400 may include a transportation management system 410, AV computing devices 450, and service facility management system 460. As illustrated in the example of FIG. 4, transportation management system 410 may include an application interface 406, an autonomous vehicle interface 408, a dispatch module 440, a route selection module 412, an autonomous vehicle monitor module 414, an autonomous data management module 416, and a logistics module 417. In particular embodiments, transportation management system 410 may include one or more data stores. As illustrated in the example of FIG. 4, transportation management system 410 may include a traffic pattern data store 418, a road condition data store 442, an autonomous route data store 422, and facility data store 423. In particular embodiments, information stored by one or more of data stores may be utilized by any of modules 412-417 and 440 in performing one or more corresponding functionalities. Although transportation management system 410 is illustrated in example of FIG. 4 as a single element, transportation management system 410 may be hosted and/or implemented by multiple computer systems and/or distributed across multiple computer systems, according to particular embodiments.

In particular embodiments, transportation management system 410 may communicate with one or more autonomous vehicle computing devices 450 and/or service facility management 460. As illustrated in the example of FIG. 4, transportation management system 410 may communicate with one or more autonomous vehicle computing devices 450 or service facility management 460 by network 420. In particular embodiments, network 420 may include one or more of a wireless network, a wired network, and an optical network, among others. For example, network 420 may include one or more of a wide area network (WAN), a private WAN, a local area network (LAN), a wireless LAN (WLAN), a public switched telephone network (PSTN), a metropolitan area network (MAN), a public WAN (e.g., an Internet), a satellite telephone network, a cellular telephone network, and a virtual private network (VPN), among others. In particular embodiments, network 420 may be coupled to one or more other networks. For example, network 420 may be coupled to one or more of a WAN, a WLAN, a PSTN, LAN, a MAN, a public WAN, a private WAN, a cellular telephone network, a satellite telephone network, and a VPN, among others.

In particular embodiments, autonomous vehicle computing device 450 may be or include a computing device integrated with an autonomous vehicle (e.g., autonomous vehicle 140 or charging service vehicle 302), such as an in-vehicle computing device configured to control AV 140 or charging service vehicle 302. In particular embodiments, autonomous vehicle interface 408 may include any software and/or hardware configured to send and receive communications and/or other information between transportation management system 410 and autonomous vehicle computing devices 450. In one example, autonomous vehicle interface 408 may be configured to receive location information, vehicle and/or ride status information, autonomous vehicle status, and/or any other relevant information from autonomous vehicle computing device 450. In another example, autonomous vehicle interface 408 may be configured to send ride requests, requestor location information, pick-up locations, travel routes, pick-up estimates, traffic information, provider updates/notifications, autonomous vehicle operating instructions, autonomous vehicle data, autonomous vehicle sensor data, and/or any other relevant information to the autonomous vehicle computing device 450. In particular embodiments, autonomous vehicle computing device 450 can be an in-vehicle computing device, such as any computing device that is configured to communicate with transportation management system 410 over one or more communication networks.

For example, autonomous vehicle computing device 450 may include an autonomous vehicle communication module 432 that is configured to manage communications with transportation management system 410 and/or service facility management 460. In particular embodiments, autonomous vehicle communication module 432 may provide vehicle, location, and travel data to transportation management system 410. In particular embodiments, autonomous vehicle computing device 450 may communicate directly with other nearby autonomous vehicle computing devices 450 to share location data and/or travel data.

In particular embodiments, telemetry data may be collected by autonomous vehicle status monitor 434. For example, autonomous vehicle status monitor 434 may record information associated with utilization of AV 140 or charging service vehicle 302. For instance, vehicle status monitor 434 may record one or more of a number of rides completed by AV 140, a number of miles traveled, a time elapsed, and other travel information since the autonomous vehicle last received maintenance. In particular embodiments, vehicle maintenance codes, such as codes associated with a check engine light, oil pressure, oil level, fuel level, etc. may also be recorded by autonomous vehicle status monitor 434. For example, autonomous vehicle information may be collected from AV 140 or charging service vehicle 302 itself (e.g., by a controller area network bus) or from application programming interfaces provided by a vehicle manufacturer, which may send data directly to an in-car console and/or to transportation management system 410. In particular embodiments, autonomous vehicle computing device 450 may request service work based on data recorded by vehicle status monitor 434. As an example and not by way of limitation, a request for service work may be sent to transportation management system 410. In particular embodiments, transportation management system 410 may identify a service facility (e.g., a service facility 100) to provide service work for AV 140.

As an example and not by way of limitation, service request application 462 may notify transportation management system 410 of availability, service type(s), etc. As an example and not by way of limitation, a service facility may be specialized to perform various service types (e.g., autonomous vehicle maintenance, vehicle maintenance, body repair, battery charging, wet cleaning, dry cleaning, etc.). Transportation management system 410 may then match AV to a service facility.

In particular embodiments, autonomous vehicle monitor module 414 may determine that an autonomous vehicle 140 is in need of service, and/or logistics module 417 may identify a service facility suitable for servicing autonomous vehicle 140 and/or may determine a time at which autonomous vehicle 140 is to be serviced at the identified service facility, based at least on the prediction of demand, after which logistics module 417 may schedule AV 140 for service work. As an example and not by way of limitation, logistics module 417 may be configured to determine (e.g., based at least on a status and/or other data received from AV 140) that AV 140 is due for periodic maintenance and/or inspection, that a battery of AV 140 needs to be recharged, AV 140 needs to be refueled (if equipped with an internal combustion engine), and/or that AV 140 is in need of one or more repairs, among others.

In particular embodiments, service-facility data may be maintained in a service facility data store 423. When a service facility is assigned to an autonomous vehicle, information relevant to that service facility may be retrieved and/or accessed from service facility data store 423. As an example and not by way of limitation, if AV 140 is matched to a service facility, information of the location (e.g., an address, a latitude and a longitude, etc.) of the service facility, a size of the service facility, and/or availability data may be retrieved from service facility data store 423. Similarly, service-facility data may be looked up for a battery charging, cleaning, and/or a maintenance facility, such as size, location, services provided, etc. For example, a battery charging facility may be associated with data describing the type of battery charging available (e.g., standard charger, fast charger, etc.) and type of battery charging station available (e.g., manual or automatic).

In particular embodiments, logistics module 417 may identify a service facility that is suitable for servicing AV 140. The identification may be based at least on particular service work to be performed on AV 140 and/or based at least on the service facilities' respective capabilities. Additional factors may include capabilities of a service facility, total capacity, availability (open service bays), or distance from the current location of AV 140 to the location of the service facility. As an example and not by way of limitation, autonomous vehicle monitor module 414 may receive status and capability information from service facility logistics module 462. As another example, autonomous vehicle monitor module 414 may receive information of the current status or anticipated future status of the identified service facilities. In particular embodiments, logistics module 417 may determine a time that AV 140 may be serviced based at least on a characteristic of AV 140, service facilities' respective availability at particular times, an estimated amount of time required to perform the service work, and/or estimates of a travel time from a current location of AV 140 to the respective service facility. Determining the time at which AV 140 is to be serviced may include determining a default interval between service appointments for multiple AVs 140 or determining an order in which AVs 140 are to be serviced.

In particular embodiments, logistics module 417 may provide instructions to AV 140 to drive to an identified service facility for scheduled service work at a determined service time. As an example and not by way of limitation, logistics module 417 may provide instructions to AV 140 to drive to the identified service facility. In particular embodiments, logistics module 417 or another portion of transportation management system 410 may be configured to communicate with autonomous vehicle computing device 450 of AV 140 to provide navigation instructions and/or other commands to AV 140. In particular embodiments, logistics module 417 may determine that AV 140 is within a threshold distance from the service facility and providing instructions to AV 140 that are configured to cause AV 140 to unlock or allow for a human worker to drive AV 140 into the service facility.

In particular embodiments, a service facility (e.g., service facility 100) may include a service facility management system 460, which may include a service facility logistics module 462. The service facility logistics module 462 may determine one or more sequences of service work to be performed on AVs 140, coordinate the flow of AVs 140 within the service facility, or assign AVs to a particular region 102 for particular servicing. In particular embodiments, one or more of the sequences of services to be performed may be determined based on performance metrics (e.g., AV or the service facility metrics) such as for example, minimizing time in the service facility, maximizing facility throughput (e.g., number of AVs serviced over a given period of time), maximizing service facility efficiency, optimizing service facility utilization, or tailoring utilization for available inventory of supplies. In particular embodiments, service facility logistics module 462 may direct and/or guide how and/or when AVs 140 are positioned within and/or to service regions 102 and/or positions of the service facility. As an example and not by way of limitation, service facility logistics module 462 may determine a sequence of work based at least on one or more of a configuration of the service facility, an availability of charge ports of the service facility, any service work for AV 140 (e.g., routine maintenance, cleaning, part replacement, repairs, etc.), and idle times of AVs 140, among others. Furthermore, service facility logistics module 462 may further determine the sequence of work based on AVs 140 already being charged and/or serviced at the service facility. In particular embodiments, service facility logistics module 462 may continually update the sequence of service work performed on AVs 140 based at least on current statuses of the service facility and future demand of services of the service facility.

Optimizing the timing to perform the sequences of service work on AV 140 may aid and/or assist in maximizing availability of AVs 140 to ride requestors. As an example and not by way of limitation, service facility logistics module 462 may determine which charging stations 220 are to provide charging services to AVs 140. In particular embodiments, service facility logistics module 462 may utilize one or more of a configuration of the identified service facility, a current availability of charging stations of the identified service facility, a future availability of charging stations of the identified service facility, a wait time for service work, a rate for service work, a capacity for service work, a number of service work types offered, an availability for service work, operator cost (e.g., labor, parts, storage, real estate, etc.), an inventory of one or more items for service work, predicted amounts of wait time for service work, predicted amounts of time for service work, a number of AVs 140 currently being serviced, and a number of AVs 140 that are scheduled to be serviced, among others, in determining one or more sequences of service work to be performed on autonomous vehicles 140.

In particular embodiments, service facility logistics module 462 may generate a predictive model for sequencing service work, flow of AVs 140, and placement of AVs 140 within the service facility using machine learning. The predictive model may be used to predicting a supply of AVs 140 available to service transportation requests within a time period and a demand for AVs 140 to service transportation requests within the time period. In particular embodiments, the predicted supply of available AVs 140 and the demand may be based on historical data, the day of the week, and time of day. In particular embodiments, the charging duration of AV 140 may be determined based on the predicted supply and demand of AV 140. As an example and not by way of limitation, because charging the batteries of AV 140 is a task that may be stopped at any time depending on need, service facility logistics module 462 may discontinue charging of AV 140 based on a model predicting a surge in ride requests (i.e., ride demand) before complete charging will be completed for the AV 140. As another example, to meet the demand, service facility logistics module 462 may schedule AV 140 to be partially charged, depending on the predicted time window of high demand and the currently available time until demand peaks.

In particular embodiments, service-facility data may include average charge duration for different types of autonomous vehicles, how long a typical charge will last in different autonomous vehicles, and/or a charge history for autonomous vehicles that have used one or more specific charging stations. As an example and not by way of limitation, the charging duration needed for charging AV 140 may be based on the current charge level of AV 140 and an amount of charge per unit of time that charging station 202 is capable of providing. In particular embodiments, service facility logistics module 462 may assign AVs 140 to their particular charging stations based on an anticipated charge duration (or fuel level) and current availability of charging stations 202, such that AVs 140 requiring the least anticipated amount of charge duration may be assigned to a charging station closer to an exit way of service facility 100. In other embodiments, service facility logistics module 462 may prioritize servicing a first AV 140 over a second AV 140 based on a determination that the charge level of the first AV 140 is more than a charge level of the second AV since the first AV 140 may be placed back into service sooner. In this case, the second AV may be matched to a service region after the matching of the first AV 140.

In particular embodiments, the time that charging of AV 140 is started may be delayed or reduced to facilitate the flow of AVs 140 leaving the region 102 with charging stations. As an example and not by way of limitation, service facility logistics module 462 may determine, based on the service-facility data, that a first charging station and a second charging station are positioned in a manner that, when the first charging station and the second charging station are occupied, AV 140 occupying the second charging station is blocked from leaving the service facility by another AV occupying the first charging station. Service facility logistics module 462 may receive AV data, that includes a charge level, that the second AV has a lower charge than the charge level of AV 140 occupying the first charging station. Service facility logistics module 462 may match the second AV to the second charging station based on the charge level of the second AV and availability information associated with the charging stations. Service facility logistics module 462 may provide to the second AV instructions to drive to the location of the second charging region after AV 140 occupies the first charging station.

In the case of a service facility that is equipped with a rotating carousel as shown in FIG. 2B, service facility logistics module 462 may send instructions for the rotating platform to rotate to a position that is configured to allow AV 140 to drive onto the rotating platform and occupy a first charging station. While AV 140 is occupying the first charging station, service facility logistics module 462 may instruct the rotating platform to rotate to a second position that is configured to allow a second AV to drive onto the rotating platform and occupy a second charging station. In the case of a service facility that is equipped with car stackers, service facility logistics module 462 may assign AVs 140 with the longest anticipated charging time (lowest amount of remaining charge) may be assigned the higher positions in the car stacker, as described above. As another example, service facility logistics module 462 may assign AVs 140 with similar anticipated charging times to the same car stacker of the service facility. In particular embodiments, service facility logistics module 462 may assign AVs 140 to charging stations near alternating exit ways to alleviate congestion while exiting the service facility.

In particular embodiments, transportation management system 410 may determine that AV 140 should be serviced in the "field" by charging service vehicle 302, rather than instructed to navigate to a service facility at a fixed location. As an example and not by way of limitation, the determination to service AV 140 in the field or navigate AV 140 to the service facility may be based on the service required by AV 140, time differences to complete the service in the field or at the service facility, or costs (e.g., comparing actual cost to perform the service and cost of time and non-revenue miles for the car to move to a service facility as compared to servicing in the field by a mobile vehicle 302). In addition, the cost of establishing the service facility (e.g. some expensive cities may have a lower service-facility capacity because of high real estate costs). Other factors may be any difficulty obtaining legal access rights to suitable meeting locations for charging service vehicle 302 (e.g. negotiated access to corporate parking lots) or possible safety concerns for the operator (if any) of charging service vehicle 302. As described above, transportation management system 410 may provide instructions to charging service vehicle 302. As an example and not by way of limitation, transportation management system 410 may determine that the service required by AV 140 may be fulfilled by a charging service vehicle 302, and that it would be faster for AV to get serviced by charging service vehicle 302 instead of recalling AV 140 to a service facility. As another example, AV 140 may be deployed in an area that is predicted to have a surge in ride demand and it would be more efficient to service AV 140 near its current location rather than recalling AV 140 to a service facility.

In particular embodiments, logistics module 417 of transportation management system 410 may determine whether AV 140 should be serviced in the "field" or instructed to navigate to a service facility based on a predicted demand and demand duration for AVs 140. As an example and not by way of limitation, the predicted demand and/or a predicted duration may be calculated based at least on historic data and received data, such as for example, logged data of the number of ride requests for a given day of the week and time of day, how the number of ride requests have been trending over a recent time period (e.g., previous 2 hours), or reports of breakdowns on alternative modes of transportation (e.g., train breakdowns). The generated prediction of demand may include a predicted demand level for each of multiple locations within a region in which AV 140 operate.

In particular embodiments, the decision whether AV 140 should be serviced in the "field" or instructed to navigate to a service facility based may be made based on a time difference between the amount of time for charging service vehicle 302 to reach AV 140 compared to the amount of time for AV 140 to navigate to a service facility. Logistics module 417 may determine the time difference between these charging options based on a predicted travel time associated with the route for AV 140 to navigate to the service facility and the route for charging service vehicle 302 to navigate to AV 140 as determined by route selection module 412. As an example and not by limitation, route selection module 412 may identify one or more autonomous-vehicle routes from autonomous route data 422 and the time to traverse the identified routes based at least on current traffic, weather, and/or other roadway conditions.

In particular embodiments, AV 140 is matched with charging service vehicle 302 based on the location of AV 140 and the location of charging service vehicle 302. In the case of logistics module 417 directing AV 140 and charging service vehicle 302 to a central location, a number of candidate locations may be stored in data store 422. As an example and not by way of limitation, these candidate locations may be pre-determined based on availability of space, the location relative to routes served by AVs 140, or an amount of vehicle traffic associated with the respective candidate location. In particular embodiments, the candidate locations may be ranked based on maximizing a number of AVs that may be served at the respective candidate location, a maximum distance between the farthest AV 140 needing servicing to the respective candidate location, or travel time for AVs 140 to navigate to the respective candidate location. As described above, transportation management system 410 may provide instructions to one or more AVs 140 to travel to the highest ranked candidate location to be serviced by charging service vehicle 302. As an example and not by way of limitation, transportation management system 410 may instruct a driver of charging service vehicle to drive to the identified location. As described above, charging service vehicle 302 may be an autonomous vehicle, which may utilize instructions from route selection module 412 to navigate to the identified location.

Figure 5:
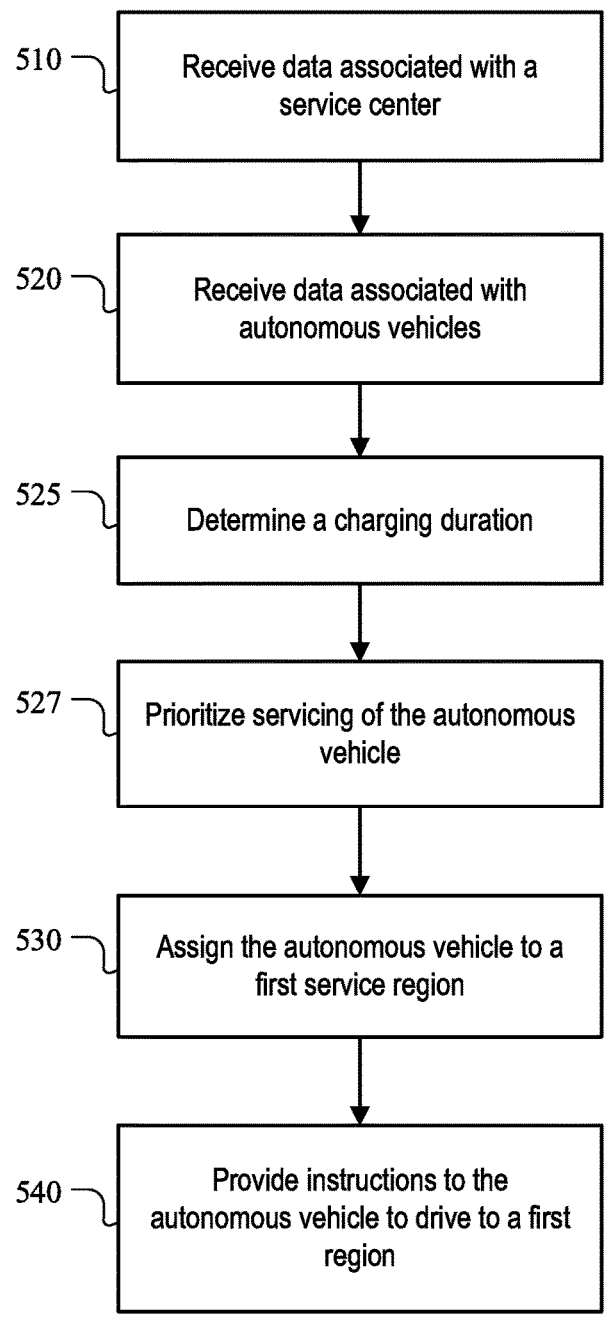
FIG. 5 illustrates an example of a method of positioning autonomous vehicles to positions within a service facility.

FIG. 5 illustrates an example method for assigning an AV to a region of a service facility. At step 510, a computing system of a service facility may receive maintenance data associated with a service facility that includes one or more service regions for servicing AVs. The maintenance data may include location information indicating a location of each of the one or more service regions and availability information indicating an availability of each of the one or more service regions. As an example and not by way of limitation, a service facility logistics module may receive information from a computing device of the charging stations that one or more charging stations of the service facility are currently unoccupied and the location of the charging stations within the service facility. In particular embodiments, each of the one or more service regions is configured to refuel or provide charge to an AV.

At step 520, the computing system of the service facility may receive data associated with a number AVs being serviced. In particular embodiments, the data associated with the AVs may include one or more of an amount of charge stored by one or more batteries of the AVs, a period of time since the autonomous vehicles were last cleaned, a period of time since the autonomous vehicles were last routinely maintained, any service work to be performed (e.g., cleaning an inside of the autonomous vehicles, cleaning an outside of the autonomous vehicles, data from one or more sensors of the autonomous vehicle, and one or more repairs to the autonomous vehicle, etc.), among others. As an example and not by way of limitation, the service facility logistics module may receive this data from a transport management system.

At step 525, the computing system of the service facility may determine a charging duration needed for charging the autonomous vehicles based on the charge level of the autonomous vehicles. In particular embodiments, the service facility logistics module may determine the charging duration based on information about the amount of charge received from an autonomous vehicle computing device of the AVs. In other embodiments, the service facility logistics module may determine the charging duration based on information of an amount of time the AV has been operating since its last charge received from the transportation management system.

At step 527, the computing system of the service facility may prioritize servicing the first autonomous vehicle over a second autonomous vehicle based on a determination that the charge level of the autonomous vehicle is more than a charge level of a second autonomous vehicle. As described above, the service facility logistics module may determine the charging duration of the second AV based on information about the amount of charge received from an autonomous vehicle computing device of the second AV. In particular embodiments, the service facility logistics module may prioritize charging of the first AV when the first AV has a shorter charging duration than the charging duration of the second AV in order to increase the number of AVs in operation to meet an expected increase in demand for rides.

At step 530, the computing system of the service facility may assign the autonomous vehicle to a first service region of the one or more service regions based on the charge level of the autonomous vehicle and the availability information associated with the one or more service regions. In particular embodiments, a service facility management logistics may direct and/or guide how and/or when the autonomous vehicle is positioned within and/or to service bays and/or positions of the service facility. As an example and not by way of limitation, the service facility logistics module may direct and/or guide autonomous vehicles to charging stations of the service facility, as illustrated in the example of FIG. 2A.

At step 540, the computing system of the service facility may provide instructions to one or more of the autonomous vehicles to drive to the first region of the service facility. In particular embodiments, a computer system associated with the service facility may navigate the autonomous vehicle to the position of the service facility. In another instance, the service facility may include a transportation system, which may include one or more conveyor belts, one or more rotation devices, etc., that may transport the autonomous vehicles to the position of the service facility. In another example, the autonomous vehicle may transport itself to the positions of the service facility. In one instance, the autonomous vehicle may receive data and/or instructions from a computer system associated with the service facility, and based at least on the data and/or the instructions from the computer system associated with the service facility, the autonomous vehicle may transport itself to the position of the service facility.

Particular embodiments may repeat one or more steps of the method of FIG. 5, where appropriate. In one example, as additional autonomous vehicles are scheduled for service at the service facility, one or more steps of the method of FIG. 5 may be repeated, where appropriate. In another example, as one or more autonomous vehicles depart the service facility, one or more steps of the method of FIG. 5 may be repeated, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method of positioning autonomous vehicles to positions of a service facility including the particular steps of the method of FIG. 5, this disclosure contemplates any suitable method of positioning autonomous vehicles to positions of a service facility including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
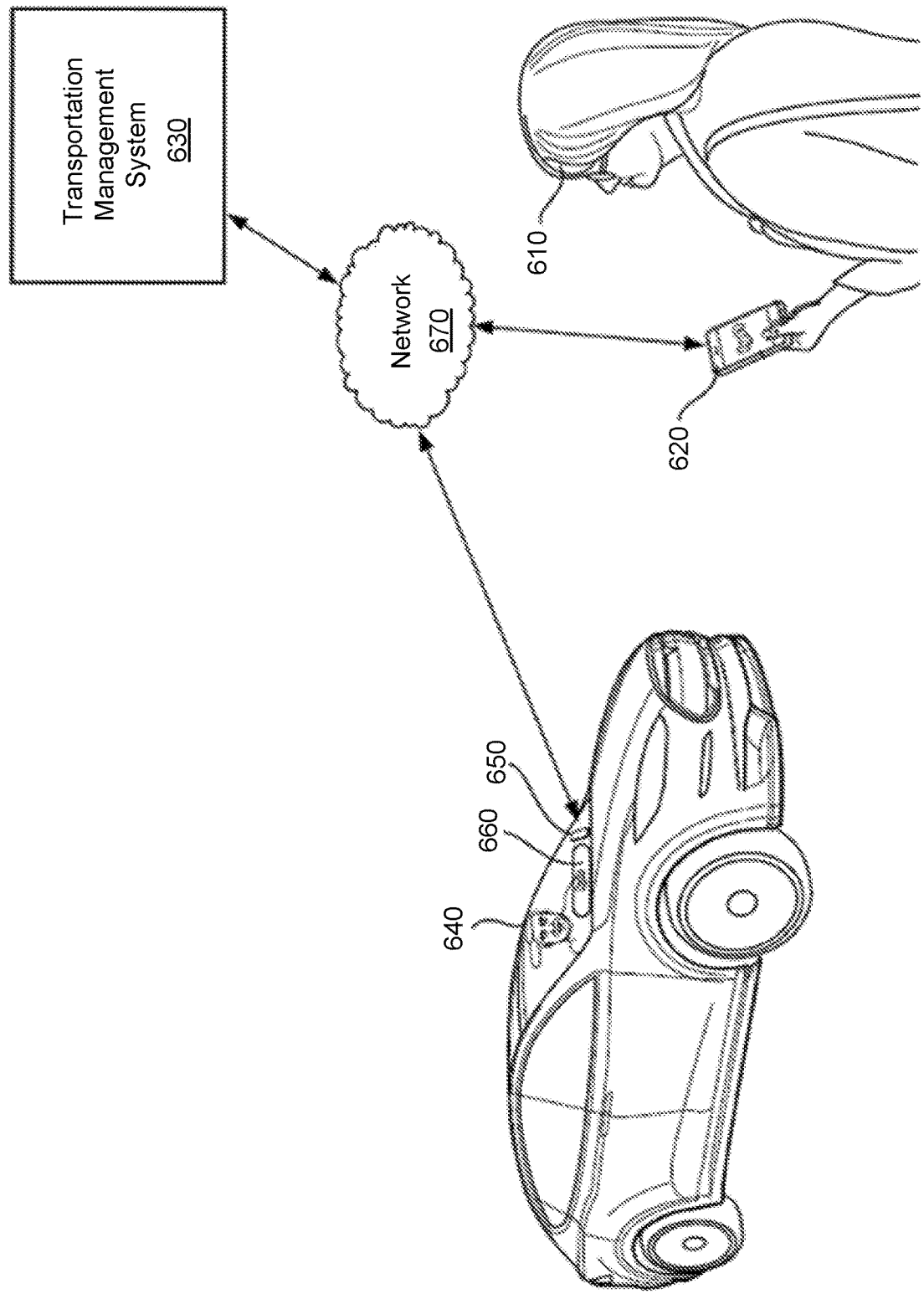
FIG. 6 illustrates an example of a transportation management system for matching ride requestors with ride providers.

FIG. 6 illustrates an example of a transportation management system 630 for matching ride requestors 610 and ride providers 640, in accordance with particular embodiments described herein. The transportation management system 630 may be configured to communicate with both the requestor's 610 computing device 620 and the provider's 640 computing device 650. The provider computing device 650 may be configured to communicate with a transportation management vehicle device 660 that is configured to easily and efficiently provide information to a provider 640 and/or a requestor 610, obtain internal sensor data pertaining to the passenger compartment of the vehicle, and/or adjust configurations of the vehicle.

In particular embodiments, the requestor 610 may use a transportation application running on a requestor computing device 620 to request a ride from a specified pick-up location to a specified drop-off location. The request may be sent over a communication network 670 to the transportation management system 630. The ride request may include request information, which may include, for example, an identifier associated with the requestor and/or the requestor computing device, user information associated with the requestor, a location of the requestor computing device at the time of the request, a requested time for the ride (e.g., at a scheduled future time or an instant/current time), and/or any other relevant information for matching the ride request with ride providers as described herein. The ride request may also include transport information, such as, e.g., a pick-up location, a drop-off location, a "best fit/predictive" location (e.g., a particular location in the origination/destination region suitable for pick-up/drop-off at a given time), preferred pick-up/drop-off location type (e.g., a curb segment), or any other suitable information for indicating the requestor's transportation preferences and/or objectives. In particular embodiments, the ride request may further include any other preferences or needs of the requestor, including, for example, navigation preferences (e.g., highways vs. local streets; particular routes; stop overs), music or entertainment preferences (e.g., link to a music playlist or station hosted by a 3rd-party music provider, news station, etc.), personalized pattern/color to display on a transportation management vehicle device to help the ride provider and requestor identify each other, particular vehicle features or restrictions (e.g., pet friendly, child seat, wheelchair accessible, maximum/minimum passenger or cargo compartment, etc.).

In particular embodiments, the transportation management system 630 may, in response to a ride request, identify available providers that are registered with the transportation management system 630 through an application installed on each of their respective mobile computing devices 650 or through an associated transportation management vehicle device 660. For example, the transportation management system 630 may locate candidate ride providers 640 who are available (e.g., based on a status indicator provided through each ride provider's 640 computing device 650) and in the general vicinity of the requested pick-up location (e.g., based on GPS data provided by the provider computing device 650 and the requestor computing device 620). The system 630 may further access various information about each candidate ride provider 640, including, for example, vehicle features (e.g., vehicle type, size, class, etc.), amenities, limitations of the vehicle, route for transporting other passengers in the vehicle in a ride-sharing scenario (e.g., the ride provider 640 may be in the process of transporting different, unrelated ride questors), schedule information regarding the ride provider's 640 future availability, diagnostics associated with the vehicle (e.g., gas level, battery level, engine status, etc.), and/or any other suitable information. In particular embodiments, the transportation management system 630 may match the information pertaining to each candidate ride provider 640 with the preferences/requirements specified in the ride request (e.g., preferred vehicle type/size, pick-up and drop-off locations, travel time constraints, etc.) and assign the candidate ride provider 640 a score that represents how good the match is. In particular embodiments, the transportation management system 630 may rank the candidate ride providers 640 based on their respective scores. In particular embodiments, the transportation management system 630 may select a number (e.g., 3, 5, 10, etc.) of top-ranking candidate ride providers 640 and inquire whether any of them is willing to fulfill the ride request. In particular embodiments, the system 630 may send notifications to those ride providers 640 one by one, in the order of their rankings (e.g., starting with the highest-ranked or best-matched one), until someone accepts. Alternatively, the system 630 may simultaneously send notifications to the selected top-ranking ride providers 640 and assign the first ride provider 640 who accepts to fulfill the ride request.

In particular embodiments, different types of information may be sent to the ride provider 640 and the ride requestor 610 during different stages of the ride-matching process. For example, the aforementioned notification for inquiring whether a ride provider 640 is interested in fulfilling a ride request may include, for example, the pick-up location of the ride request, estimated time of travel, fees for the ride, particular ride requirements (e.g., car seat availability), the ride requestor's 610 rating on the system 630, and any other pertinent information that would allow the ride provider 640 to make an informed decision as to whether to accept or reject the ride request. Upon seeing the notification, the provider 640 may accept or reject the ride request through the provider communication device 650. In particular embodiments, the provider computing device 650 may notify the transportation management system 630 that the provider 640 received the notification and further inform the system 630 of whether the provider 640 accepted or rejected the request. The information sent to the system 630 may include, for example, an acceptance indicator (e.g., a flag) and current location of the ride provider 640. In particular embodiments, the provider 640 may be predictively and/or automatically matched with a ride request such that the provider 640 is not required to explicitly accept the request. For instance, the provider 640 may enter a mode where the provider 640 agrees to accept all requests that are sent to the provider 640 without the ability to decline and/or review requests before accepting. Once a ride provider 640 accepts the ride request, the transportation management system may send the ride provider 640 additional information, such as the requestor's 610 profile information (e.g., name, profile picture, etc.), destination information, route from the requested origination location to the destination locations, navigation instructions to the pick-up location, and any other suitable information that would help the ride provider 640 fulfill the ride request.

In particular embodiments, after a ride provider 640 accepted the ride request, the transportation management system 630 may provide the ride requestor 610 information pertaining to the ride provider 640. The information may include, for example, the ride provider's 640 profile information (e.g., name, representative symbol or graphic, social-media profile picture, rating, past ride history and reviews, etc.), a suggested route from the requested origination location to the destination location, tracking information that indicates the ride provider's 640 current location, estimated fare, and/or any other relevant information that facilitates the transaction and informs the ride requestor 610 of what to expect.

In particular embodiments, the transportation management system 630 may provide information to the ride requestor device 620 and the provider device 650 (and/or transportation management vehicle device 660) to facilitate the parties finding each other. For example, the system 630 may monitor the GPS locations of the requestor computing device 620 and provider computing device 650 and make the GPS location of one device available to the other device. For example, as the provider computing device 650 gets closer to the request location, the transportation management system may monitor the location of the provider computing device 650 and send the location of the requestor computing device 620 to the provider computing device 650 (and vice versa). As such, the provider computing device 650 may display the current location of the requestor computing device 620 to allow the provider 640 find and pick-up the requestor 610. In particular embodiments, the provider computing device 650 may determine a proximity vector between the present location of the provider computing device 650 and the location of the requestor computing device 620. Based on this information, the provider computing device 650 may provide navigating instructions to the provider 640 so that the provider 640 may find the exact location of the requestor 610.

To further guide the provider 640, the transportation management system 630 and/or the provider computing device may determine and provide a proximity indicator (e.g., a color, pattern, image, animation, and/or pattern of colors) to be presented on a display visible to the provider 640. The display may be on the provider computing device 650, the transportation management vehicle device 660, and/or a display integrated with the vehicle. Proximity indicators may also include additional or other types of multimedia elements such as sounds, audio/visual presentations, haptic feedback (e.g., vibrations, etc.), holograms, augmented reality presentations, etc. For example, a haptic-feedback proximity indicator may cause devices within the vehicle (e.g., the computing device 650, the transportation management vehicle device 660, and/or components of the vehicle, such as the steering wheel) to vibrate. The vibration (or any other type of proximity indicator) may become stronger or weaker depending on the distance to the requestor computing device 620. The provider computing device 650 may present the proximity indicator so that the provider 640 may quickly and easily navigate to the location of the requestor 610. In particular embodiments, the provider computing device 650 may pass the proximity indicator to a transportation management vehicle device 660 that is configured to present the corresponding color, pattern, pattern of colors, animation, and/or image on a large display that can easily, intuitively, and safely be followed by the driver to the location of the requestor 610. The indicator provided by the transportation management vehicle device 660 may also be visible to the ride requestor 610 through the vehicle's windshield. In particular embodiments, the ride requestor 610, knowing or having been informed of the proximity indicator's characteristics (e.g., a particular color, greeting, animation, etc.), may look for such proximity indicator in nearby vehicles to find the ride provider 640. Similarly, the indicator may also be displayed on the requestor's computing device 620, and the requestor 610 may hold the device 620 so that nearby drivers could see the displayed proximity indicator for purposes of helping the parties locate each other.

In particular embodiments, an interaction indicator associated with the requestor 610 of a matched ride may be displayed based on the proximity between the requestor computing device 620 and the provider computing device 650. For example, when the parties are within a distance threshold of each other, an interaction indicator including a name, a graphic, and/or a greeting generated based on the requestor's information and/or provider's information may be presented on the provider computing device 650 and/or the transportation management vehicle device 660. Similar to the techniques described herein related to the proximity indicator, the interaction indicator may be displayed to provide a welcoming interaction to the requestor 610 upon the requestor 610 approaching and/or entering a vehicle of the provider 640. Similar to the proximity indicator, the interaction indicator may be displayed on any number of different displays within the provider vehicle and/or through the transportation management vehicle device 660. Additionally, the same techniques described herein regarding the provider computing device 650 may be implemented by the requestor computing device 620 to display an interaction indicator and/or proximity indicator on the requestor computing device 620 or an associated display.

Figure 7:
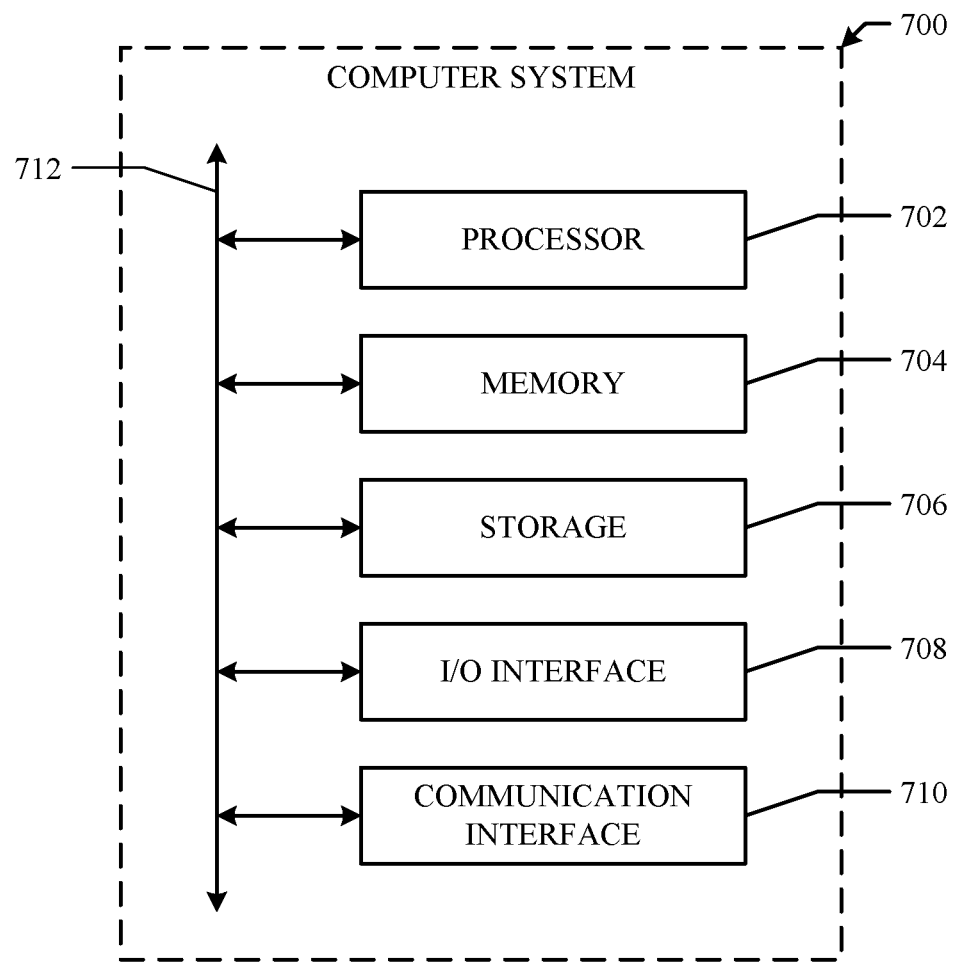
FIG. 7 illustrates an example of a computing system.

FIG. 7 illustrates an example computer system. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data facilities; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described in further detail below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system, comprising:
   one or more processors; and
   one or more computer-readable non-transitory storage media coupled to the one or more processors, the one or more computer-readable non-transitory storage media comprising instructions that are operable, when executed by the one or more processors, to cause the system to:
   receive service facility data associated with a service facility, the service facility comprising at least a first service region and a second service region for servicing at least one vehicle, wherein the service facility data comprises:
      availability information indicating an availability of each of the first service region and the second service region to perform a plurality of types of vehicle services capable of being performed on the at least one vehicle; and
      service information indicating the plurality of types of vehicle services capable of being performed on the at least one vehicle at the first service region and the second service region;
   determine one or more types of vehicle services, selected from the plurality of types of vehicle services capable of being performed, to perform on the at least one vehicle;
   determine an estimated service duration for each of the first service region and the second service region to perform the one or more types of vehicle services on the at least one vehicle;
   determine, based on the service facility data, the first service region or the second service region is a part of one or more accessways of the service facility, wherein the one or more accessways are shared by the at least one vehicle and one or more other vehicles during the estimated service duration for performing the one or more types of vehicle services on the at least one vehicle;
   determine the service facility is capable of servicing the at least one vehicle at the first service region or the second service region while enabling one or more other vehicles to enter or exit the service facility via the one or more accessways of the service facility;
   assign the at least one vehicle to the first service region or the second service region based at least in part on the availability information, the service information, and the estimated service duration for each of the first service region and the second service region to perform the one or more types of vehicle services on the at least one vehicle; and
   provide instructions to the at least one vehicle to drive to the first service region or the second service region based at least in part on the assignment.

2. The system of claim 1, wherein the instructions are operable to further cause the system to:
   in response to determining that the first service region is available to perform the one or more types of vehicle services for the estimated service duration, provide additional instructions to the at least one vehicle to drive to the first service region.

3. The system of claim 1, wherein the instructions are operable to further cause the system to:
   predict a number of available vehicles to service transportation requests within a time period; and
   predict a number of service transportation requests within the time period;
   wherein determining the estimated service duration for each of the first service region and the second service region to perform the one or more types of vehicle services on the at least one vehicle is further based on the predicted number of available vehicles capable of meeting the predicted number of transportation requests within the time period.

4. The system of claim 1, wherein the plurality of types of vehicle services capable of being performed include at least one of a vehicle maintenance or a vehicle repair, and the vehicle maintenance includes at least one of charging, refueling, cleaning, tire rotation or update vehicle software.

5. The system of claim 1, wherein the service facility data comprises location information indicating a first location of the first service region and a second location of the second service region, and wherein the instructions comprise instructions that are operable to further cause the system to:
   determine, based on the service facility data, that the first location of the first service region and the second location of the second service region are positioned in a manner so that, a second vehicle occupying the second service region is blocked from leaving the service facility by a first vehicle occupying the first service region;
   receive a request to perform one of the plurality of types of vehicle services capable of being performed on the second vehicle;
   determine, based on vehicle data associated with the second vehicle, an estimated service duration for performing the one of the plurality of types of vehicle services capable of being performed on the second vehicle, wherein the estimated service duration for the second vehicle is longer than an estimated service duration for performing one of the plurality of types of vehicle services capable of being performed on the first vehicle;
   assign the second vehicle to the second service region based on the estimated service duration for the second vehicle and the availability information; and
   provide, to the second vehicle, instructions to drive to the second location of the second service region after the first vehicle is assigned to the first service region.

6. The system of claim 1, wherein the instructions comprise instructions that are operable to further cause the system to:
   send instructions to a computing device of the first service region or the second service region to obtain sensor data associated with the at least one vehicle while the at least one vehicle is being serviced.

7. The system of claim 1, wherein the instructions are operable to further cause the system to:
   determine at least one of the one or more types of vehicle services at the first service region or the second service region;
   determine a performance metric associated with performing the at least one of the one or more types of vehicle services at the first service region or the second service region; and based on the performance metric, determine a future demand of the one or more types of vehicle services at the first service region and the second service region.

8. The system of claim 1, wherein the instructions are operable to further cause the system to:
determine a utilization metric associated with the service facility, wherein the utilization metric is based on a number of vehicles serviced in at least one of the first service region or the second service region during a predetermined time period; and
assign the at least one vehicle to the first service region or the second service region based on the utilization metric.

9. The system of claim 8, wherein the at least one vehicle is part of a fleet of vehicles, and the utilization metric is utilized to determine a number of vehicles of the fleet of vehicles available to satisfy a demand for ride requests.

10. The system of claim 1, wherein the instructions are operable to further cause the system to:
receive information comprising an indication of performing the one or more types of vehicle services on the at least one vehicle.

11. A method comprising, by a computing system:
receiving service facility data associated with a service facility, the service facility comprising at least a first service region and a second service region for servicing at least one vehicle, wherein the service facility data comprises:
availability information indicating an availability of each of the first service region and the second service region to perform a plurality of types of vehicle services capable of being performed on the at least one vehicle; and
service information indicating the plurality of types of vehicle services capable of being performed on the at least one vehicle at the first service region and the second service region;
determine one or more types of vehicle services, selected from the plurality of types of vehicle services capable of being performed, to perform on the at least one vehicle;
determining an estimated service duration for each of the first service region and the second service region to perform the one or more types of vehicle services on the at least one vehicle;
determining, based on the service facility data, the first service region or the second service region is a part of one or more accessways of the service facility, wherein the one or more accessways are shared by the at least one vehicle and one or more other vehicles during the estimated service duration for performing the one or more types of vehicle services on the at least one vehicle;
determining the service facility is capable of servicing the at least one vehicle at the first service region or the second service region while enabling one or more other vehicles to enter or exit the service facility via the one or more accessways of the service facility;
assigning the at least one vehicle to the first service region or the second service region based at least in part on the availability information, the service information, and the estimated service duration for each of the first service region and the second service region to perform the one or more types of vehicle services on the at least one vehicle; and providing instructions to the at least one vehicle to drive to the first service region or the second service region based at least in part on the assignment.

12. The method of claim 11, further comprising:
in response to determining that the first service region is available to perform the one or more types of vehicle services for the estimated service duration, providing additional instructions to the at least one vehicle to drive to the first service region.

13. The method of claim 11, further comprising:
predicting a number of available vehicles to service transportation requests within a time period; and
predicting a number of service transportation requests within the time period;
wherein determining the estimated service duration for each of the first service region and the second service region to perform the one or more types of vehicle services on the at least one vehicle is further based on the predicted number of available vehicles capable of meeting the predicted number of transportation requests within the time period.

14. The method of claim 11, wherein the plurality of types of vehicle services capable of being performed include at least one of a vehicle maintenance or a vehicle repair, and the vehicle maintenance includes at least one of charging, refueling, cleaning, tire rotation or update vehicle software.

15. The method of claim 11, wherein the service facility data comprises location information indicating a first location of the first service region and a second location of the second service region, the method further comprising:
determining, based on the service facility data, that the first location of the first service region and the second location of the second service region are positioned in a manner so that, a second vehicle occupying the second service region is blocked from leaving the service facility by a first vehicle occupying the first service region;
receiving a request to perform one of the plurality of types of vehicle services capable of being performed on the second vehicle;
determining, based on vehicle data associated with the second vehicle, an estimated service duration for performing the one of the plurality of types of vehicle services capable of being performed on the second vehicle, wherein the estimated service duration for the second vehicle is longer than an estimated service duration for performing one of the plurality of types of vehicle services capable of being performed on the first vehicle;
assigning the second vehicle to the second service region based on the estimated service duration for the second vehicle and the availability information; and
providing, to the second vehicle, instructions to drive to the second location of the second service region after the first vehicle is assigned to the first service region.

16. The method of claim 11, further comprising:
determining a utilization metric associated with the service facility, wherein the utilization metric is based on a number of vehicles serviced in at least one of the first service region or the second service region during a predetermined time period; and
assigning the at least one vehicle to the first service region or the second service region based on the utilization metric.

17. A computer-readable non-transitory storage medium, the computer-readable non-transitory storage medium comprising instructions operable, when executed by one or more processors, to cause the one or more processors to:

receive service facility data associated with a service facility, the service facility comprising at least a first service region and a second service region for servicing at least one vehicle, wherein the service facility data comprises:

availability information indicating an availability of each of the first service region and the second service region to perform a plurality of types of vehicle services capable of being performed on the at least one vehicle; and service information indicating the plurality of types of vehicle services capable of being performed on the at least one vehicle at the first service region and the second service region;

determine one or more types of vehicle services, selected from the plurality of types of vehicle services capable of being performed, to perform on the at least one vehicle;

determine an estimated service duration for each of the first service region and the second service region to perform the one or more types of vehicle services on the at least one vehicle;

determine, based on the service facility data, the first service region or the second service region is a part of one or more accessways of the service facility, wherein the one or more accessways are shared by the at least one vehicle and one or more other vehicles during the estimated service duration for performing the one or more types of vehicle services on the at least one vehicle;

determine the service facility is capable of servicing the at least one vehicle at the first service region or the second service region while enabling one or more other vehicles to enter or exit the service facility via the one or more accessways of the service facility;

assign the at least one vehicle to the first service region or the second service region based at least in part on the availability information, the service information, and the estimated service duration for each of the first service region and the second service region to perform the one or more types of vehicle services on the at least one vehicle; and provide instructions to the at least one vehicle to drive to the first service region or the second service region based at least in part on the assignment.

18. The computer-readable non-transitory storage medium of claim 17, further comprising instructions to cause the one or more processors to:

in response to determining that the first service region is available to perform the one or more types of vehicle services for the estimated service duration, provide additional instructions to the at least one vehicle to drive to the first service region.

19. The computer-readable non-transitory storage medium of claim 17, further comprising instructions to cause the one or more processors to:

predict a number of available vehicles to service transportation requests within a time period; and predict a number of service transportation requests within the time period;

wherein determining the estimated service duration for each of the first service region and the second service region to perform the one or more types of vehicle services on the at least one vehicle is further based on the predicted number of available vehicles capable of meeting the predicted number of transportation requests within the time period.

20. The computer-readable non-transitory storage medium of claim 17, wherein the plurality of types of vehicle services capable of being performed include at least one of a vehicle maintenance or a vehicle repair, and the vehicle maintenance includes at least one of charging, refueling, cleaning, tire rotation or update vehicle software.

* * * * *